(12) United States Patent
Price

(10) Patent No.: US 9,597,994 B1
(45) Date of Patent: Mar. 21, 2017

(54) RECREATIONAL VEHICLE WITH SPACE SAVING MOVEABLE KITCHEN SECTION

(71) Applicant: 1925650 Ontario Inc., Mississauga (CA)

(72) Inventor: Gordon Scott Price, Georgetown (CA)

( * ) Notice: Subject to any disclaimer, the term of this patent is extended or adjusted under 35 U.S.C. 154(b) by 0 days.

(21) Appl. No.: 14/883,244

(22) Filed: Oct. 14, 2015

(51) Int. Cl.
*B60P 3/34* (2006.01)

(52) U.S. Cl.
CPC ...................... *B60P 3/34* (2013.01)

(58) Field of Classification Search
CPC ........................................................ B60P 3/34
See application file for complete search history.

(56) References Cited

U.S. PATENT DOCUMENTS

| | | | | |
|---|---|---|---|---|
| 6,098,346 A | * | 8/2000 | Miller | B60P 3/36 296/171 |
| 6,293,612 B1 | * | 9/2001 | Crean | B60P 3/36 296/175 |
| 2015/0102632 A1 | * | 4/2015 | Pham | B60P 3/34 296/175 |
| 2016/0288690 A1 | * | 10/2016 | Wills | B60P 3/34 |

* cited by examiner

*Primary Examiner* — Lori L Lyjak
(74) *Attorney, Agent, or Firm* — Edgar Chana Law P.C.

(57) ABSTRACT

A recreational vehicle having a slide-out section is disclosed having a space saving moveable kitchen section that provides for more efficient usage of the interior space of the recreational vehicle. The moveable kitchen section is hingedly attached to a fixed kitchen section in the main housing of the recreational vehicle and can move between a stowed position and a kitchen position. In the stowed position the slide-out section can retract and in the kitchen position the moveable kitchen section swings into the kitchen to provide more useable kitchen space.

12 Claims, 4 Drawing Sheets

RECREATIONAL VEHICLE WITH SPACE SAVING MOVEABLE KITCHEN SECTION

FIELD

The present disclosure relates generally to recreational vehicles. More particularly, the disclosure relates to motor vehicles or trailers that include a slide-out section to expand the interior space when the recreational vehicle is parked.

BACKGROUND

In the recreational vehicle industry, room slide-outs are used to increase the interior space of the recreational vehicle by having one or two sections along an exterior wall of the vehicle that slide outwards away from the main body of the recreational vehicle. An expanded position provides more internal living space for the comfort and convenience of occupants. A retracted position conforms the recreational vehicle to street legal specifications and increases rigidity and aerodynamic performance so that the recreational vehicle is mobile.

Each slide-out system commonly involves a single, integrated structure which can be moved with respect to the recreational vehicle chassis. The slide-out structure consists of a floor, a ceiling, side walls, and an exterior wall which are connected together. The slide-out is sized and dimensioned so that it can pass through an opening in an exterior wall of the vehicle, and is typically mounted and motor driven so that it may move outward into an expanded or extended position for use in that position, and inward into a retracted position for driving.

The recreational vehicle industry bases the size of the vehicle or trailer on pre-manufactured chassis sizes and the towing capacity of built-in engines or towing vehicles. This engine-chassis limitation makes it very important to optimize the interior living space of the vehicle and to also optimize the weight of the recreational vehicle. A recreational vehicle that can maximize interior space of a chassis will be preferable to recreational vehicle customers.

U.S. Pat. No. 6,565,144 to Cream describes a recreational vehicle with a walk-in closet that has a moveable foldable wardrobe that is pivotally mounted to a stationary cabinet by way of a vertical hinge. In Cream, when the extendable housing is deployed, a space is created that enables the foldable wardrobe to be deployed.

U.S. Pat. No. 4,685,719 to Hanemaayer describes a convertible sitting-sleeping arrangement for a recreational vehicle. Hanemaayer describes folding doors which define partitions that are moveable from positions covering and concealing the toilet area from view to positions where the toilet area is open for use by using a pair of panels hinged together on their long edge.

SUMMARY

According to a first aspect, a recreational vehicle is provided comprising a main housing having fixed kitchen cabinetry, a slide-out section that moves between an extended position and a retracted position, wherein the slide-out section is within the main housing in the retracted position and the slide-out section extends from the main housing in the extended position to provide increase interior space, and a moveable kitchen section hingedly attached to the fixed kitchen cabinetry, the moveable kitchen section moveable between a stowed position and a kitchen position, wherein the stowed position of the moveable kitchen section allows the slide-out section to retract and the kitchen position of the moveable kitchen section provides increased kitchen space when the slide-out section is in the extended position.

In some aspects, the moveable kitchen section can be hingedly attached by a vertical hinge to the fixed kitchen cabinetry of the main housing. In other aspects, the moveable kitchen section can extend from a floor to a ceiling of the main housing of the recreational vehicle. The slide-out section can include a kitchen portion and a bunk portion, and the moveable kitchen section can separate the kitchen portion from the bunk portion when the slide-out section is in the extended position and the moveable kitchen section is in the kitchen position. The bunk portion can have a foldable bunk and other bedroom furniture.

In some aspects the moveable kitchen section can have one or more casters on a bottom surface of the moveable kitchen section to aid in movement of the moveable kitchen section. In some aspects, the moveable kitchen section can have a ceiling sweep and/or a floor sweep. The kitchen section can have cabinets, or include any one or more of a countertop and a kitchen appliance.

In some aspects, the recreational vehicle can further include a stowed position latch to retain the moveable kitchen section in the stowed position and a kitchen position latch to retain the moveable kitchen section in the kitchen position. In a related aspect, the recreational vehicle can also have an electro-mechanical system to extend and retract the slide-out section, a kitchen position safety switch, and a stowed position safety switch, wherein the kitchen position safety switch prevents the electro-mechanical system from retracting the slide-out section and the stowed position safety switch allows the electro-mechanical system to retract the slide-out section.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The term recreational vehicle (or RV) is used throughout to refer to either a motor vehicle or trailer that is equipped with living space and amenities typically found in a home. A recreational vehicle typically includes a kitchen, a bathroom, and on or more sleeping facilities.

This disclosure is directed towards recreational vehicles that include a slide-out that allows the interior space of the RV to be increased by a sections that expands outwards from the vehicle. Many modern North American RVs include at least one slide-out section. Typically at least one slide-out section is used to expand the kitchen of the RV. Slide-outs are often incorporated in motorhomes and larger trailers, often those coupled to a pickup truck using a fifth-wheel hitch in the truck bed.

Figure 1:
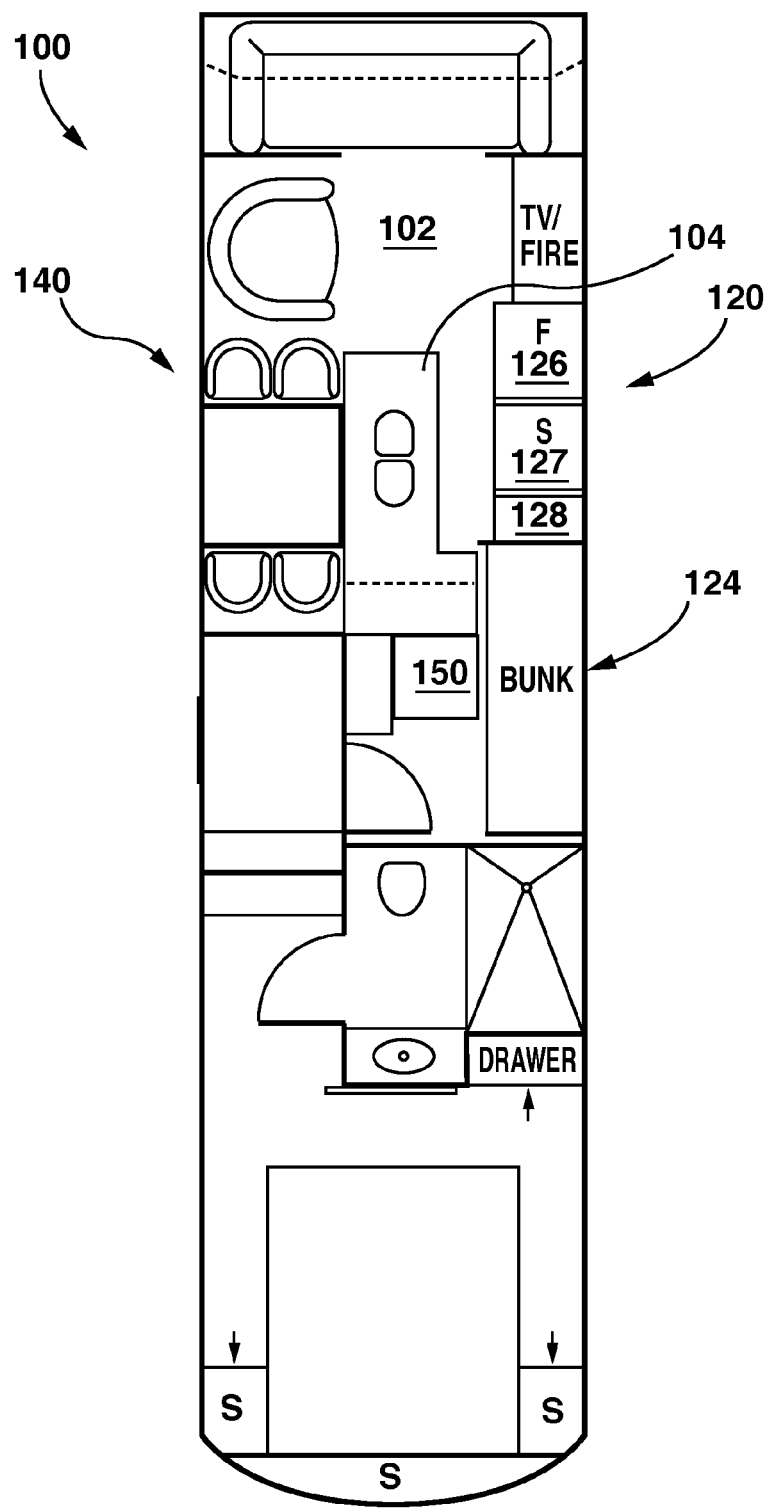
FIG. 1 is a top plan view a recreational vehicle (RV) showing the interior having slide-out sections in a retracted position.
Figure 2:
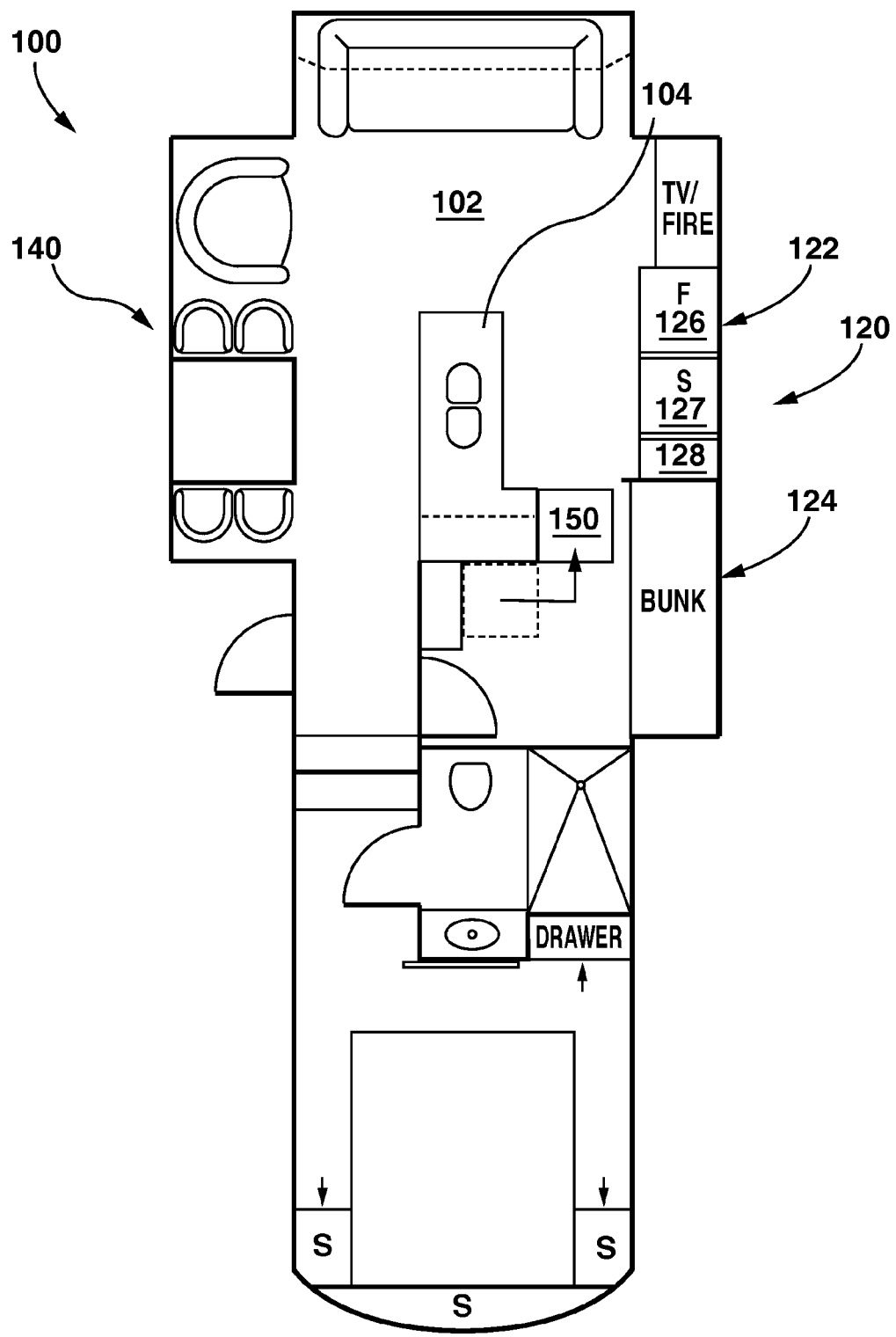
FIG. 2 is a top plan view of the recreational vehicle (RV) of FIG. 1 showing the interior expanded with the slide-out sections in an extended position.

Reference will now be made to the drawings wherein like numerals refer to like parts throughout. FIG. 1 illustrates a top plan view of the interior of one embodiment of a recreational vehicle (RV) 100 having a first slide-out section 120 and second slide-out section 140 in a retracted position. FIG. 2 illustrates a top plan view of the embodiment of FIG. 1. with slide-out sections 120, 140 in an extended position to increase the interior space of RV 100. FIGS. 1 and 2 illustrate a fifth-wheel trailer type of recreational vehicle that would be pulled by a truck.

Main chassis of RV 100 includes the generally rectangular frame (not shown) of the vehicle on which main housing 102 and running gear are mounted. Slide-out sections 120, 140 are within main housing 102 in the retracted position shown in FIG. 1, and slide-out sections 120, 140 extend from main housing 102 in the extended position to provide increased interior space as shown in FIG. 2.

Slide-out section 120 extends to provide increased interior space for the kitchen of RV 100. Slide-out section 120 includes both a kitchen portion 122 and a bunk portion 124. Kitchen portion 122 can include a refrigerator 126, a stove 127, and a pantry 128, for example. Main housing 102 has kitchen cabinetry 104 that is fixed to the main housing 102. Preferably, fixed kitchen cabinetry 104 provides a countertop and houses plumbing, such as for a kitchen sink and/or dishwasher. Kitchen portion 122 of slide-out section 120 opposes fixed kitchen cabinetry 104 of main housing 102 to allow for increase of kitchen interior space between them in the extended position of slide-out section 120 as shown in FIG. 2.

The kitchen of RV 100 further includes a moveable kitchen section 150 that is hingedly attached to fixed kitchen cabinetry 104. Moveable kitchen section 150 can move between a stowed position and a kitchen position, shown in FIGS. 1 and 2, respectively. The stowed position provides a more compact arrangement within main housing 102 to allow slide-out 120 to retract into main housing 102. The kitchen position allows moveable kitchen section 150 to be accessed from within the kitchen of RV 100. Moveable kitchen section 150 preferably extends from floor to ceiling of the main housing to separate kitchen portion 122 and bunk portion 124 of slide-out section 120 in the extended position and thus, can also act as a room divider in those embodiments. In other embodiments, moveable kitchen section 150 can be half-height and simply provide a countertop with cabinetry below.

Figure 3:
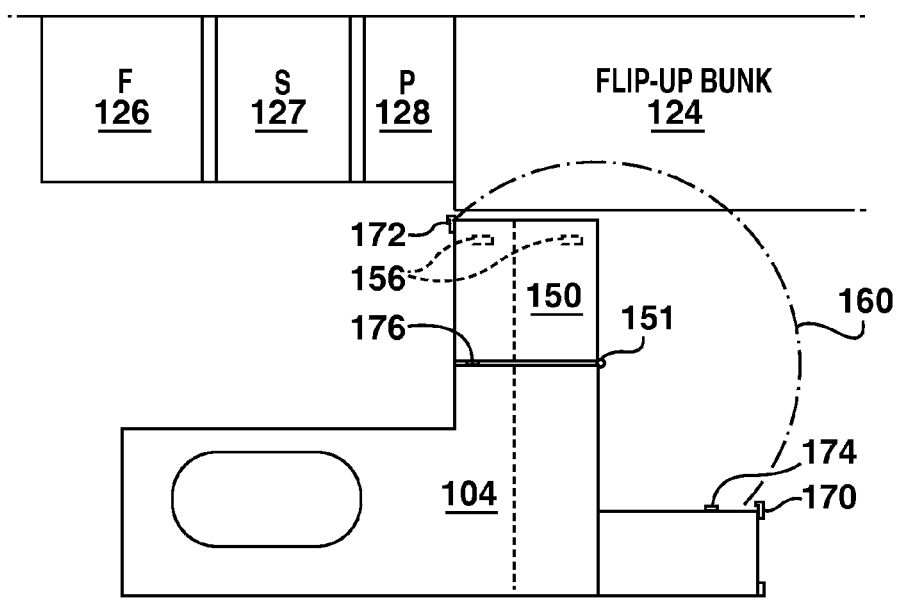
FIG. 3 is a top plan view of a moveable kitchen section in the kitchen position of the recreational vehicle (RV) shown in FIG. 2.

Moveable kitchen section 150 can be hingedly attached to fixed kitchen cabinetry 104 of main housing 102 by hinge 151. This allows moveable kitchen section to rotate about hinge 151 between the stowed position in FIG. 1 and the kitchen position in FIG. 2. Referring now to FIG. 3, a top plan view is shown of moveable kitchen section 150 in the kitchen position illustrating the path of rotation with dotted line 160. Preferably hinge 151 is a full-length hinge (or piano hinge) that can help support the weight of moveable kitchen section 150. Moveable kitchen section 150 can further include one or more casters 156 that can be mounted to the bottom surface of moveable kitchen section 150. Casters 156 can assist with supporting the weight of moveable kitchen section 150 and enable easier rolling movement of moveable kitchen section 150.

Other embodiments can attach moveable kitchen section 150 to a vertical pole that rotates about its longitudinal axis to allow moveable kitchen section 150 to move between stowed and kitchen positions. The rotatable vertical pole can also be coupled to the electromechanical system that extends and retracts slide-out section 120 to cause the vertical pole to rotate moveable kitchen section 150 with the motion of slide-out section 120.

Referring to FIG. 3, the path of movement of moveable kitchen section 150 is illustrated by dotted line 160. Bunk portion 124 preferably includes a flip-up bunk that can be folded upwards to accommodate the rotation of moveable kitchen section 150 between the kitchen position and stowed position. Having a flip-up bunk is preferable because the area of the bunk enclosed by the side of moveable kitchen section 150 can serve as the foot-end of the bunk. Other embodiments can substitute bunk portion 124 with other rooms or furnishings so long as they do not impede the movement of moveable kitchen section 150.

Moveable kitchen section 150 can be secured in position with a latch to prevent movement between the stowed position and kitchen position. Prior to retracting slide-out section 120, moveable kitchen section 150 should be secured in the stowed position to accommodate the movement of slide-out section 120 retracting within RV 100. Stowed position latch 170 can be used to secure moveable kitchen section 150. Stowed position latch 170 couples moveable kitchen section 150 to another immovable surface within the main housing 102 of RV 100. When the RV is parked and slide-out section 120 is extended, then moveable kitchen section 150 can be moved into the kitchen position and secured with kitchen position latch 172 to retain kitchen moveable section 150 in the kitchen position.

Slide-out sections 120, 140 are typically controlled by an electromechanical system that extend and retract the slide-out sections. These systems can include electric screw-type extenders, electric gear motors, hydraulic rams, or other electromechanical systems known in the art. Typically there is a two-way switch at the entrance to the RV to allow the owner to extend the slide-out sections before entering the RV or retracting the slide-out sections upon exiting the RV.

In order to prevent retraction or extension of slide-out section 120 when moveable kitchen section 150 is not in the proper position, a safety switch coupled to the electromechanical system can be used. For example, a stowed position safety switch 174 can be used to indicate that the moveable kitchen section 150 is in the stowed position and the electromechanical system can retract slide-out section 120. Stowed position safety switch 174 can be a push button type switch that is activated by moveable kitchen section 150 compressing the button. When stowed position safety switch is not activated (indicating that moveable kitchen section 150 is not in the stowed position) then the electromechanical system will not be able to retract slide-out section 120. Some embodiments can further include a kitchen position safety switch that indicates that moveable kitchen section 150 is in the kitchen position and that slide-out section 120 should not be retracted. In some embodiments, safety switches 174, 176 can be integrated with stowed position latch 170 and kitchen position latch 172, respectively.

Figure 4:
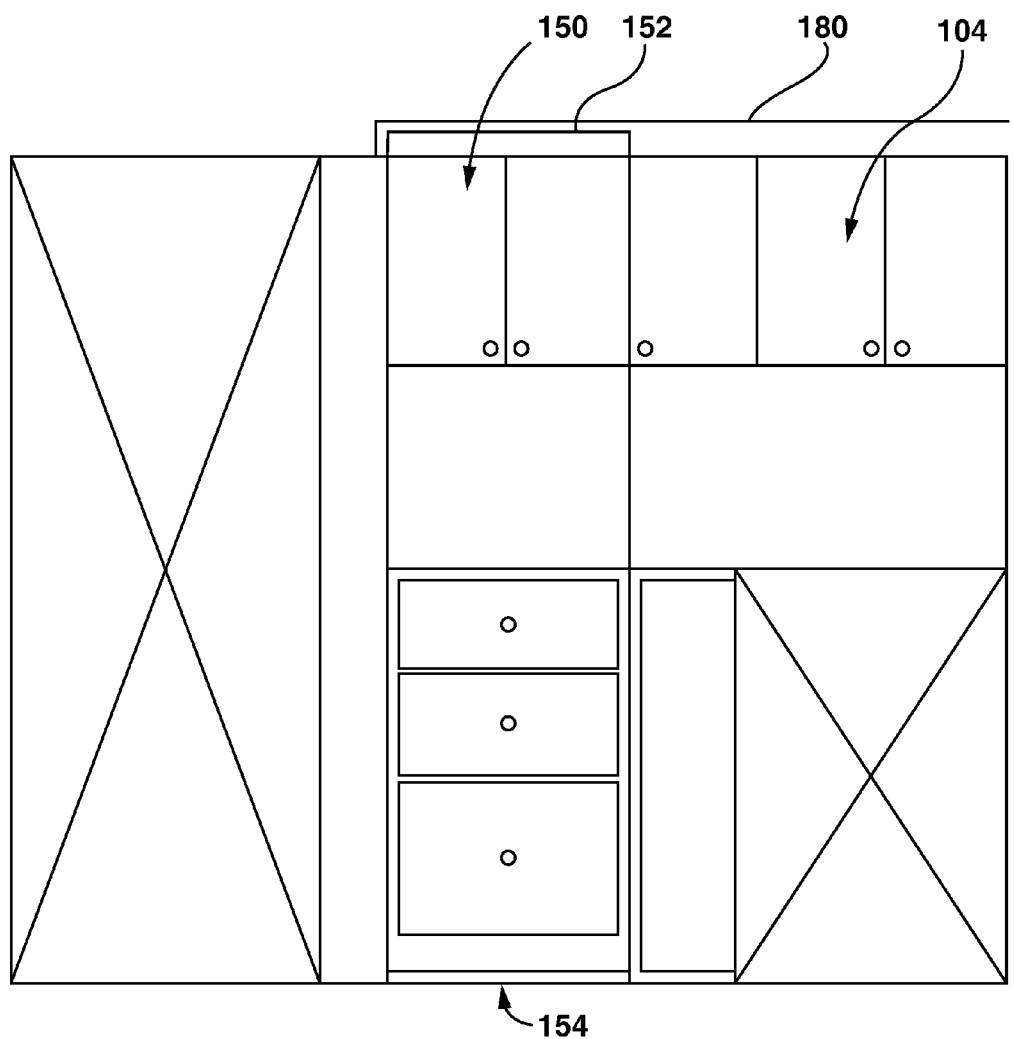
FIG. 4 is a front view of a moveable kitchen section shown in the kitchen position.

Referring now to FIG. 4, a front view of moveable kitchen section 150 is shown in the kitchen position from within the kitchen of RV 100. Main housing 102 of RV 100 typically includes an increased ceiling height 180 to accommodate slide-out section 120 moving within main housing 102 when slide-out section 120 is retracted. The embodiment illustrated shows moveable kitchen section 150 extending between the floor and ceiling of RV 100. Moveable kitchen section 150 provides clearance between the floor and ceiling height 180 to allow movement and can include a sweep on the bottom and top surfaces to close the gap provided by the clearance for improved aesthetics and sound proofing. Ceiling sweep 152 can be placed on the top surface of moveable kitchen section 150 and floor sweep 154 can be placed on the bottom surface of moveable kitchen section 150. Fixed kitchen cabinetry 104 can also include ceiling sweep that extends to ceiling height 180 and accommodates slide-out section 120 when retracted. Door sweep and ceiling sweeps can be made from vinyl strip or a brush-type material.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A recreational vehicle comprising:
a main housing having fixed kitchen cabinetry;
a slide-out section that moves between an extended position and a retracted position, wherein the slide-out section is within the main housing in the retracted position and the slide-out section extends from the main housing in the extended position to provide increase interior space; and
a moveable kitchen section hingedly attached to the fixed kitchen cabinetry, the moveable kitchen section moveable between a stowed position and a kitchen position, wherein the stowed position of the moveable kitchen section allows the slide-out section to retract and the kitchen position of the moveable kitchen section provides increased kitchen space when the slide-out section is in the extended position.

2. The recreational vehicle of claim 1 wherein the moveable kitchen section is hingedly attached by at least one vertical hinge to the fixed kitchen cabinetry of the main housing.

3. The recreational vehicle of claim 1 wherein the moveable kitchen section extends from a floor to a ceiling of the main housing.

4. The recreational vehicle of claim 3 wherein the slide-out section has a kitchen portion and a bunk portion, and the moveable kitchen section separates the kitchen portion from the bunk portion when the slide-out section is in the extended position and the moveable kitchen section is in the kitchen position.

5. The recreational vehicle of claim 4 wherein the bunk portion comprises a foldable bunk.

6. The recreational vehicle of claim 3 wherein the moveable kitchen section has at least one caster on a bottom surface of the moveable kitchen section.

7. The recreational vehicle of claim 3 wherein the moveable kitchen section has at a ceiling sweep.

8. The recreational vehicle of claim 3 wherein the moveable kitchen section has at a floor sweep.

9. The recreational vehicle of claim 1 where the kitchen section comprises cabinets.

10. The recreational vehicle of claim 9 where the kitchen section further comprises any one or more of a countertop and a kitchen appliance.

11. The recreational vehicle of claim 1 further comprising a stowed position latch to retain the moveable kitchen section in the stowed position and a kitchen position latch to retain the moveable kitchen section in the kitchen position.

12. The recreational vehicle of claim 1 further comprising an electro-mechanical system to extend and retract the slide-out section, a kitchen position safety switch, and a stowed position safety switch, wherein the kitchen position safety switch prevents the electro-mechanical system from retracting the slide-out section and the stowed position safety switch allows the electro-mechanical system to retract the slide-out section.

\* \* \* \* \*